United States Defensive Publication [19] (H) [11] T958,001

Gower et al. [43] May 3, 1977

[54] METAL-COMPLEXED POLYMER

[75] Inventors: Bob G. Gower, Park Forrest; Thomas J. Collachia, Chicago, both of Ill.

[73] Assignee: Sinclair Oil Corporation, New York, N.Y.

[21] Appl. No.: 718,304

[22] Filed: Aug. 26, 1976

Related U.S. Application Data

[63] Continuation of Ser. No. 499,714, Aug. 22, 1974, abandoned, which is a continuation of Ser. No. 390,974, Aug. 23, 1973, abandoned, which is a continuation of Ser. No. 786,409, Dec. 23, 1968, abandoned.

[51] Int. Cl.[2] ..... C09G 1/04

[52] U.S. Cl. ..... 106/10; 260/29.6 BM; 260/29.6 M; 526/328; 526/344

[57] ABSTRACT

A metal-complexed polymer prepared from ethylenically-unsaturated monomers, such as styrene, with a copolymer of styrene and maleic anhydride incorporated into the main polymer backbone to contribute carboxyl functionality, is disclosed. The resulting polymer is complexed with a metal such as zinc to achieve a crosslinked, highly insoluble film. These metal-complexed polymers may be employed in the preparation of metal-complexed, detergent-resistant coating compositions.

1 Claim, No Sheets Drawing,

26 Pages Specification

The file of this unexamined application may be inspected and copies thereof may be purchased (849 O.G. 1221, Apr. 9, 1968).